UNITED STATES PATENT OFFICE.

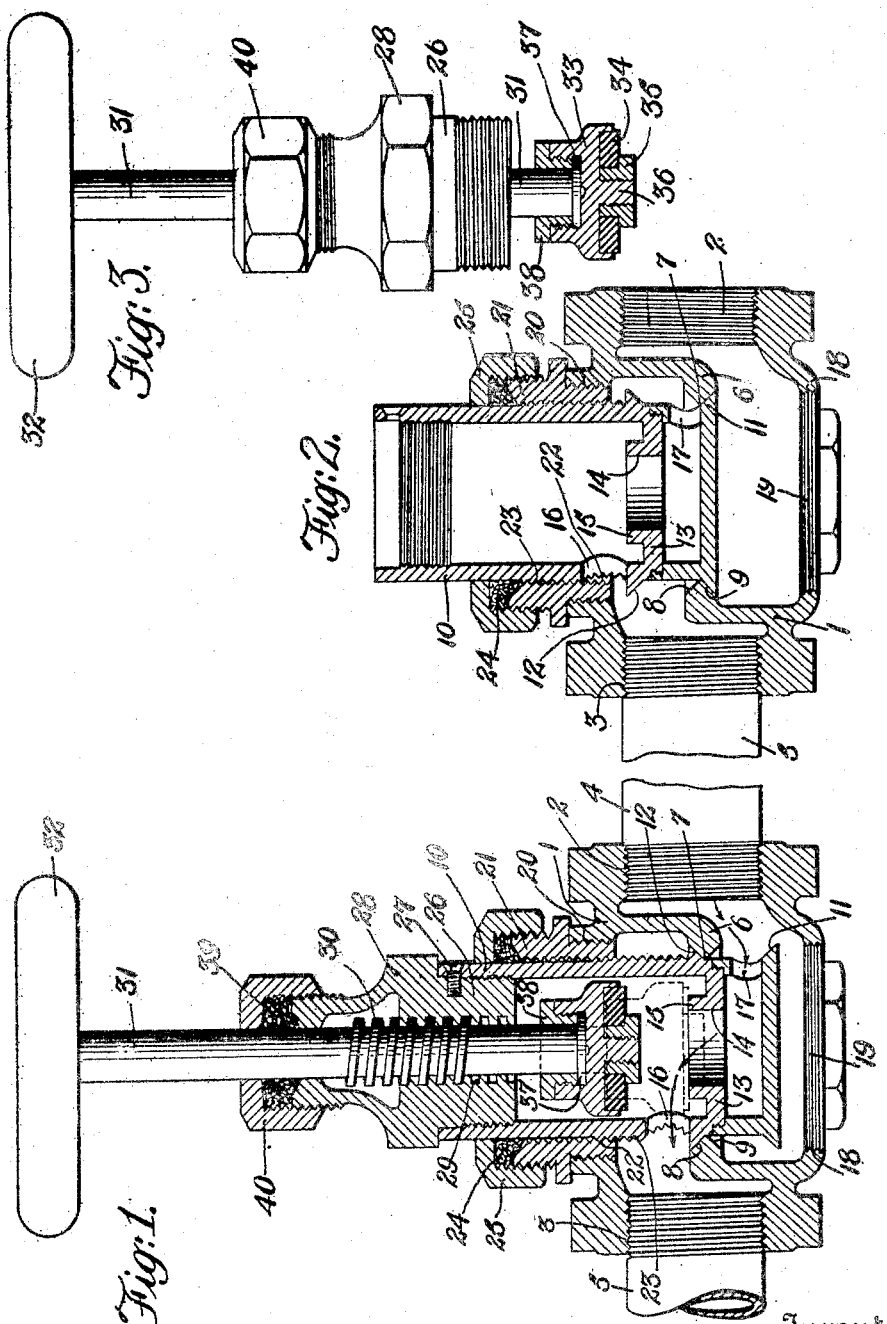

WILLIAM B. BRASSINGTON, OF PORT RICHMOND, NEW YORK.

VALVE.

1,379,388.    Specification of Letters Patent.    Patented May 24, 1921.

Application filed February 13, 1920. Serial No. 358,507.

*To all whom it may concern:*

Be it known that I, WILLIAM B. BRASSINGTON, a citizen of the United States, residing at Port Richmond, in the county of Richmond and State of New York, have invented certain new and useful Improvements in Valves; and I do hereby declare the following to be a full, clear, and exact description of the invention, such as will enables others skilled in the art to which it appertains to make and use the same.

My invention consists in the novel features hereinafter described, reference being had to the accompanying drawing which illustrates one embodiment of the invention, selected by me for purposes of illustration, and the said invention is fully disclosed in the following description and claims.

In the use of valves in steam lines and other lines, leaks often develop on account of defects or wear in the valve stem packing, or due to the failure of the valve to properly seat, owing to injuries to the valve seat or to the valve itself, which cannot be conveniently repaired, owing to the fact that access cannot be had to the valve seat and valve without discontinuing the use of the entire pipe line, and in some instances without putting the plant or a portion of the plant out of commission. This is especially true in steam lines, particularly in relation to the valves thereof nearest the source of supply, and as a result in thousands of instances valves are permitted to remain in a leaky condition with the consequent wastage of steam or other fluid passing through the line, and involving a corresponding loss of efficiency in the operation of the line.

The object of my invention is to provide a valve which is so constructed that at any time it may be repaired by regrinding the valve seat where necessary, by repairing or replacing the valve proper, or by repacking the valve stem, to prevent leakage, and otherwise maintain the valve in a high state of efficiency and without the necessity of more than temporarily interfering with the operation of the line. To this end I provide the valve casing with a longitudinally movable sleeve having a part extending through the communicating aperture in the partition of the valve casing, said sleeve carrying the main valve seat, the valve and its operating stem, and being provided with apertures communicating respectively with the inlet and outlet apertures of the valve casing, when the sleeve is in normal position, the said sleeve being provided with an auxiliary cut off valve adapted by the movement longitudinally of the sleeve, to close the communicating aperture in the internal web or partition of the valve casing, and thereby permitting the removal of the valve for repairs to it and to the valve seat, or to the packing of the valve stem.

In the accompanying drawing,

Figure 1 represents a vertical longitudinal sectional view of a valve embodying my present invention and selected by me for purposes of illustration, the longitudinally movable sleeve being shown in normal position and the main valve being shown in open position.

Fig. 2 is a similar view showing the valve casing and sleeve, the latter being in position to cause the auxiliary cut off valve to close the aperture in the internal partition of the valve casing, and the main valve with its stem and gland or packing being removed.

Fig. 3 is a detail view of the main valve with its stem and gland detached.

Referring to the embodiment of my invention herein shown, 1 represents the valve casing which is provided with inlet and outlet apertures, here indicated at 2 and 3 respectively, which are preferably threaded in the usual manner for the reception of the usual nipples or pipe sections 4 and 5, which may constitute portions of a pipe line for conveying steam or other fluid or liquid. Within the valve casing is a partition 6 interposed between the inlet and outlet apertures, and provided with a communicating aperture 7 which is preferably formed with an annular beveled valve seat 8 above the same and an oppositely beveled annular valve seat 9 below the same, as indicated in the drawings. 10 represents the longitudinally movable sleeve which extends through an aperture in the valve casing concentric with the communicating aperture 7, and has a portion extending through said communicating aperture. The said sleeve is provided at its lower or inner end with an auxiliary cut off valve, indicated at 11, closing the lower end of the sleeve and having an annular beveled portion, which is adapted to engage the valve seat 9, as shown in Fig. 2, when the sleeve is in its withdrawn position, to make a tight joint. The valve sleeve is also provided with an annular valve portion 12 above the partition 6 in the form of an annular beveled flange, for engaging the valve seat 8, as shown in Fig. 1, when the sleeve is in normal position, to make a tight joint. One advantage of the annular beveled valves and seats resides in the fact that the beveled or conical valve portion can be more readily forced into its corresponding seat to make a perfectly tight joint than where it is attempted to obtain a tight joint between a valve and seat having plane or flat surfaces. Another advantage resulting from the beveled form of valves and seats is that any sediment deposited thereon, as on the valve 11, when in open position, will tend to slide off and not remain as it would upon a horizontal surface, and this keeps the valve 11 clean when not in use, so that when it is brought into use, in case of an emergency it can be drawn tightly against its seat to fulfil its function. Within the valve sleeve is provided a transverse partition 13 having a central aperture 14 which forms the main communicating aperture of the valve and is surrounded by valve seat 15. The valve sleeve is provided with lateral apertures 16 and 17 respectively, preferably located on opposite sides of the partition 13 and communicating with the inlet and outlet apertures of the valve casing, respectively. For convenience of assembling, I prefer to make the lower portion of the sleeve carrying the auxiliary cut off valve 11 separate from the upper portion to which it is connected by screw threads, or otherwise, in order that the parts of the sleeve can be assembled on opposite sides of the partition 6 within the valve casing, and I also prefer to provide the valve casing at the bottom with an aperture 18, closed by a plug 19, which may be threaded or otherwise secured therein after the sleeve is assembled and placed in the valve casing, to facilitate the introduction of the lower portion of the sleeve. For the same purpose I prefer to provide the upper side of the valve casing with an enlarged aperture 20 of greater diameter than the sleeve 10 and to fit the same with a bushing 21, as shown, the said bushing being threaded into the aperture 20 and provided internally for a portion of its lengths at least with screw threads, as indicated at 22, engaging a threaded portion 23 at the lower end of the sleeve 10, so that by rotating the sleeve within the bushing, the sleeve will be moved longitudinally. The bushing 21 is to all intents and purposes a part of the valve casing, but is made separate therefrom to facilitate the insertion of the sleeve which on account of the projecting annular valve portion 12 could not otherwise be conveniently inserted in the casing. In order to make a tight joint between the sleeve and valve casing, I prefer to provide a gland of ordinary construction, and to this end the upper end of the bushing 21 is preferably provided with an annular recess to receive packing 24 which is compressed by a threaded follower 25 engaging a threaded portion of the bushing, as indicated in the drawings. The upper portion of the sleeve which passes through the gland is preferably cylindrical and smooth so as to make a tight joint in all positions of the sleeve. This gland is very important as it permits the sleeve to be forced down to any extent required to make a tight joint between the annular beveled valve portion 12 and the beveled seat 8 and at the same time permits the sleeve to be withdrawn when required to seat the auxiliary valve 11 on the seat 9 without at any time permitting the escape of the fluid in the pipe line which may be and frequently is under high pressure, the escape of which fluid would result in injury to the operator or operators and to the building in which the valve may be located. In the upper end of the sleeve I provide a plug, indicated at 26, which is threaded into the upper end of the sleeve as shown, and is preferably held from rotation with respect to the sleeve in any desired way, as by means of a removable screw 27, the plug having a hexagonal portion 28, by means of which it can be conveniently rotated with the sleeve, or with respect to the sleeve as desired. The plug 26 is provided with a central longitudinal aperture having coarse threads, indicated at 29, to engage corresponding threads 30 on the valve stem 31, which is provided at its upper end with the usual hand wheel 32, or other means for turning the same. The lower end of the stem 31 carries the main valve which is secured to the stem, in the present instance, as follows:—33 represents a metal valve body provided on its lower face with an annular recess to receive the valve proper 34, which may be of fiber, rubber, soft metal, or other suitable material, held in place by a shouldered nut 35 on a threaded stem 36 provided on the lower face of the valve body. The upper face of the valve body is provided with a central recess to receive the lower end of the valve stem 31, which stem is preferably provided at its lower end with an enlargement 37, in this instance, formed by a disk made separate from the valve stem and secured thereto, and the valve stem and body are held in association by a threaded sleeve 38 screwed into the recess in the upper portion of the valve body, thus holding the valve stem and body so that they will move vertically together but permit of a relative rotation between them to avoid undue wear of the valve 34 upon its seat. In order to prevent the escape of steam or other fluid or liquid around the valve stem 31, the upper end of the plug 26 is provided with a packing recess surrounding the valve stem to receive packing 39, which is compressed around the valve stem by a follower 40 in the usual manner.

Fig. 1 represents the position of the sleeve 10 when the valve is in operation, the valve itself being shown in open position in this figure. It will be seen that the sleeve is in its lowermost position with the valve 12, in contact with the valve seat 8. The flow of steam or other fluid, or liquid, through the valve casing, will be as indicated by the arrows in Fig. 1, through the inlet aperture, or from pipe 4, for example, through the lateral aperture 17 in the sleeve, through the main valve aperture 14 in the sleeve, and thence through the aperture 16 of the sleeve to the outlet aperture 3 and pipe 5. Obviously the valve may be closed by screwing down the valve stem 31 until the valve 34 engages the seat 15, as indicated in dotted lines in Fig. 1.

If now it is desired to repair the valve or repack either of the glands, it is only necessary to rotate the sleeve 10 in such a direction as to move it longitudinally in the valve casing to bring the auxiliary cut off valve 11 in engagement with the valve seat 9, as shown in Fig. 2, thereby cutting off all communication between the inlet and outlet openings 2 and 3, by closing the opening in the partition 6. This rotation of the sleeve can be effected by applying a wrench to the hexagonal portion 28 of the plug 26, or otherwise as desired. By loosening the screw 27, the plug 26 can be unscrewed and the valve, together with its stem, can be entirely removed, as indicated in Figs. 2 and 3. This affords full opportunity not only to repair or replace the valve 34 in case the latter has been worn, or to repair or replace the packings for the glands, but also affords an opportunity to regrind the valve seat 15, as clearly shown in Fig. 2 by the use of an appropriate tool which can be inserted within the sleeve 10 for the purpose. When the valve and plug 26 have been replaced within the sleeve 10 the latter can be turned so as to restore it to normal position, and the valve used in the ordinary manner.

By means of my improved valve it will be seen that the valve or packings can be renewed or repaired or the valve seat ground without permitting the escape of steam or other fluid passing through the valve, and without interfering with the free passage of steam or other fluid through the valve except for a very short interval required in making the repairs.

What I claim and desire to secure by Letters Patent is:—

1. The combination with a valve casing provided with inlet and outlet apertures, a partition having a communicating aperture therein and valve seats on its upper and lower faces surrounding said aperture, said casing being provided with a sleeve aperture coaxial with said communicating aperture, of a sleeve closed at its lower end and extending through said sleeve aperture, and communicating aperture, and provided with an annular valve portion above said partition normally engaging the upper valve seat thereof, and an annular beveled valve portion below said partition for engaging the lower valve seat thereof, but normally out of engagement therewith, said sleeve being provided with lateral apertures communicating respectively with the inlet and outlet apertures of the casing, and an intermediate main valve aperture and seat, a main valve carried by said sleeve for engaging said main valve seat, and a packing gland for effecting a tight joint at all times between the sleeve and the valve casing, while permitting the longitudinal movement of the sleeve to bring one or the other of its said valve portions into engagement with its respective seat.

2. The combination with a valve casing provided with inlet and outlet apertures, a partition having a communicating aperture therein, and valve seats on its upper and lower faces surrounding said aperture, said casing being provided with a sleeve aperture coaxial with said communicating aperture, of a sleeve closed at its lower end and extending through said sleeve aperture, and communicating aperture, and provided with an annular valve portion above said partition normally engaging the upper valve seat thereof, and an annular beveled valve portion below said partition for engaging the lower valve seat thereof, but normally out of engagement therewith, said sleeve being provided with lateral apertures communicating respectively with the inlet and outlet apertures of the casing, and an intermediate main valve aperture and seat, a main valve carried by said sleeve, for engaging said main valve seat, said sleeve having a plain cylindrical exterior portion and a threaded exterior portion engaging a threaded part connected with the valve casing, whereby rotation of the sleeve will effect longitudinal movement thereof, and a packing gland for insuring a tight joint at all times between the plain cylindrical portion of the sleeve and the casing, while permitting the longitudinal movement of the sleeve to bring one or the other of its valve portions into engagement with its respective seat.

3. The combination with a valve casing provided with inlet and outlet apertures, a partition provided with a communicating aperture and oppositely beveled valve seats on its upper and lower faces, said casing having a sleeve aperture coaxial with said communicating aperture, of a bushing threaded into said sleeve aperture and provided with a packing recess, a sleeve closed at its lower end extending through said bushing and through the said communicating aperture, and provided with annular beveled valve portions above and below said partition for engaging said beveled valve seats, said sleeve being provided with lateral apertures located respectively on opposite sides of said partition when the sleeve is in normal position and having an intermediate aperture provided with a main valve seat, a main valve carried by said sleeve, for engaging said main valve seat, said sleeve having a threaded portion engaging said bushing, and a plain cylindrical portion extending through said packing recess, packing in said recess, and a follower portion engaging said bushing for compressing said packing.

In testimony whereof I affix my signature.

WILLIAM B. BRASSINGTON.